(No Model.) 4 Sheets—Sheet 1.
M. GANDY.
MACHINE FOR THE MANUFACTURE OF BELTING.
No. 314,825. Patented Mar. 31, 1885.
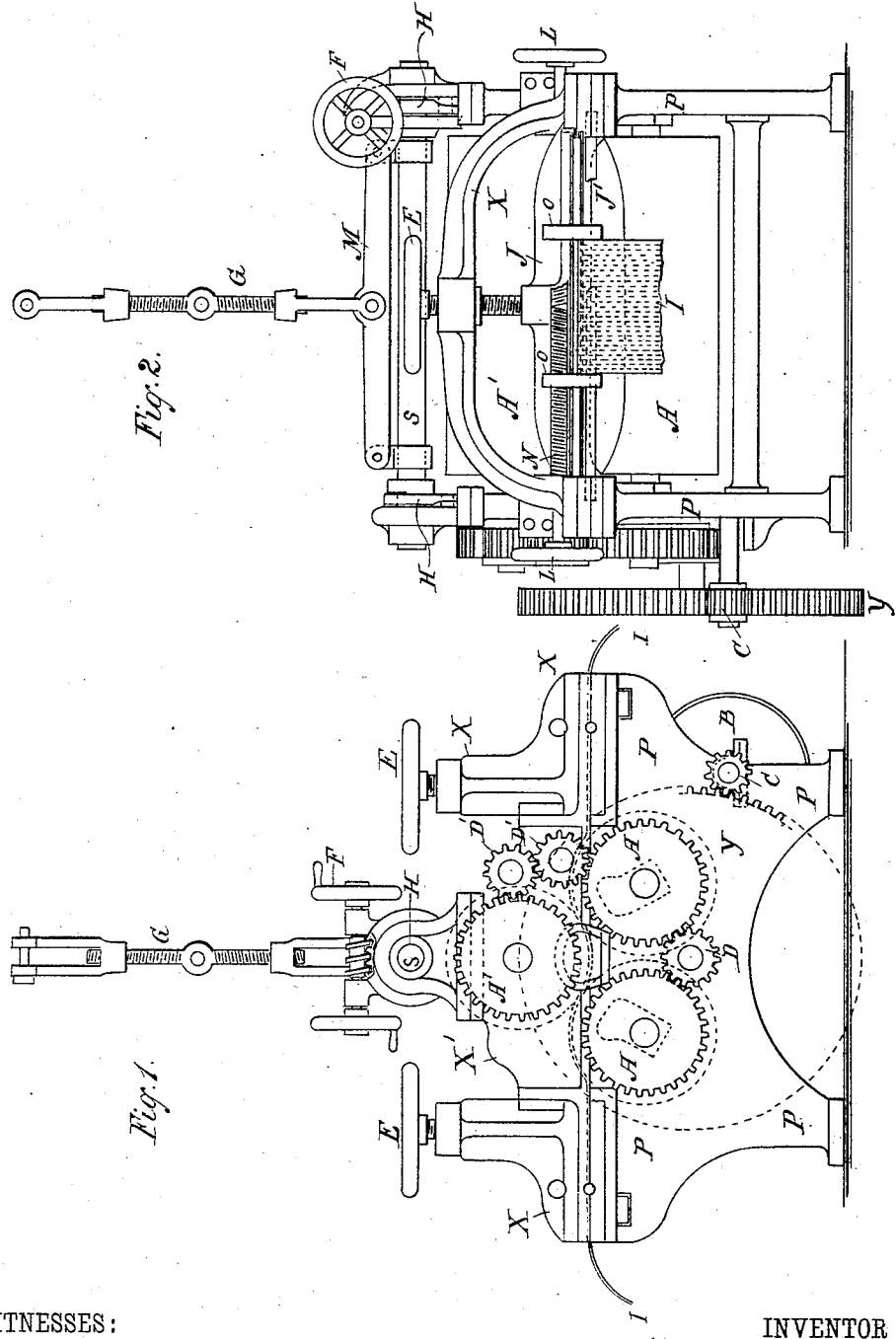
WITNESSES:
INVENTOR
BY
ATTORNEY (No Model.)  4 Sheets—Sheet 2.
M. GANDY.
MACHINE FOR THE MANUFACTURE OF BELTING.
No. 314,825.  Patented Mar. 31, 1885.
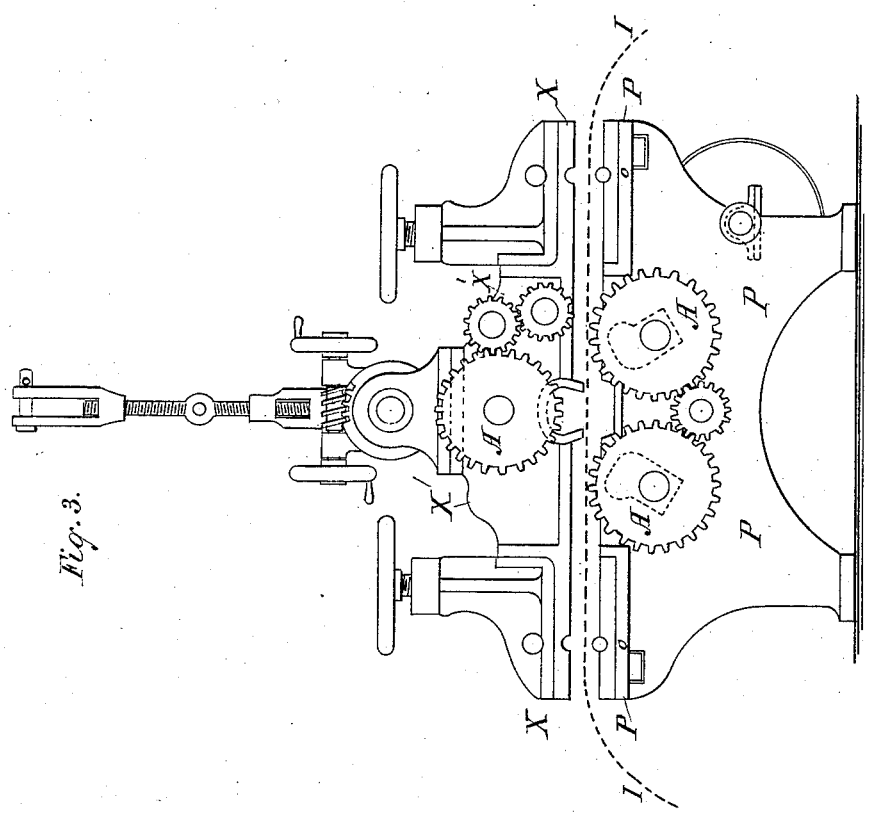
WITNESSES:
INVENTOR
Maurice Gandy
BY
ATTORNEY (No Model.) 4 Sheets—Sheet 3.

M. GANDY.
MACHINE FOR THE MANUFACTURE OF BELTING.

No. 314,825. Patented Mar. 31, 1885.

WITNESSES: INVENTOR

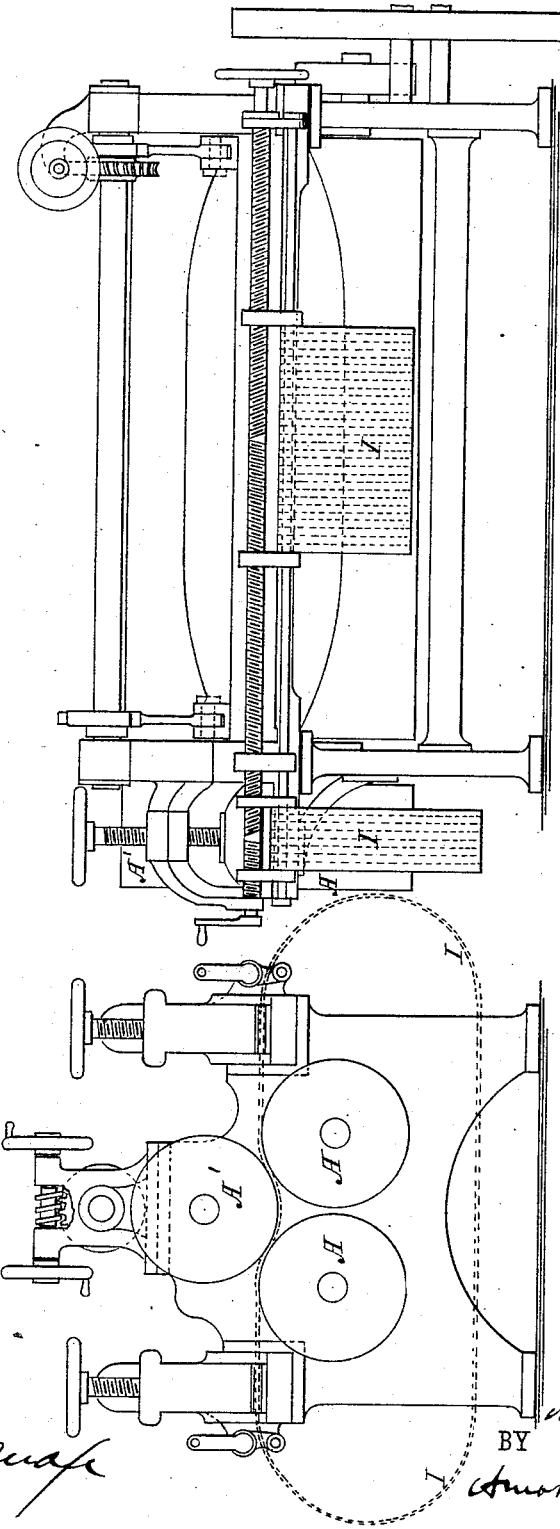

United States Patent Office.

MAURICE GANDY, OF LIVERPOOL, ENGLAND.

MACHINE FOR THE MANUFACTURE OF BELTING.

SPECIFICATION forming part of Letters Patent No. 314,825, dated March 31, 1885.

Application filed September 2, 1884. (No model.)

*To all whom it may concern:*

Be it known that I, MAURICE GANDY, a subject of the Queen of Great Britain, residing in Liverpool, England, have invented a certain new and Improved Machine to be Used in the Manufacture of Belts or Bands for Driving Machinery, of which the following is a description in such full, clear, exact, and concise terms as to enable any one skilled in the arts to which it appertains to make and use the same, reference being had to the accompanying drawings, making part of this specification, and to the figures and letters of reference marked thereon.

Figure 5:
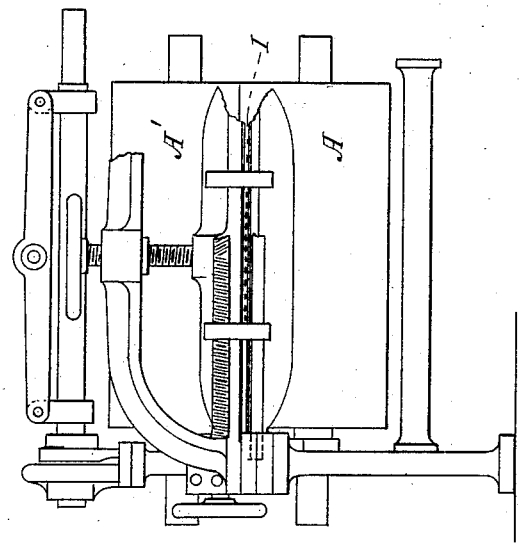

Reference being had to said drawings, Figures 1, 3, 4, and 6 are end elevations of my said machine and modifications thereof; and Figs. 2, 5, and 7 are front elevations of the same, all of said figures to be hereinafter more fully described.

My invention relates to the manufacture of belts composed of cotton, canvas, or duck, folded, stitched, and saturated with oil, substantially as shown and described in Letters Patent of the United States granted to me June 1, 1880, and is intended to be used to accomplish one of the steps in the manufacture of this variety of belt when made in the form of a circle, and termed "endless belts," in contradistinction to the ordinary belt, the ends of which are joined together by a lacing or some other suitable appliance well known to belt makers and users. The ordinary belt can be taken up, when it becomes slack, by cutting out a piece and relacing its ends; but it will be understood that such means of shortening is not applicable to endless belts, by which is meant a belt made of one piece, in a circle, and without an end, for the express purpose of avoiding the cutting and lacing the ends, as in the ordinary belt. In such endless belts it is of paramount importance to remove their elasticity in the process of manufacturing them, so that they are not liable to stretch when at work on the pulleys; otherwise they have to be cut and taken up, as in the case of an ordinary belt. The object of my present invention, therefore, is the production of a machine in which an endless belt can be stretched and calendered the same substantially as I now stretch and calender the ordinary belt as part of the process of manufacturing it, by which the first step is taken toward removing its elasticity.

My said invention consists of a calendering and stretching machine so constructed that a belt manufactured in the endless form can have the single part of it inserted between the rollers and stretching-nippers, and the calendering and stretching applied to that single part round and round continuously until every part of it is fully stretched and calendered, and the whole is rendered smooth and comparatively non-elastic, the operation being a preparatory treating and stretching of the belt previous to the application of the oil and paint used to complete its manufacture, the final stretching being accomplished after the oil and paint have been applied, upon another machine.

Upon reference to the patent above referred to, dated June 1, 1880, it will be observed that the belt is passed between a set of calender-rollers and through stretching-nippers, one pair of which is placed on each side of the rollers. The end of the belt being entered into the nippers on one side of the rollers passes between them and through the nippers on the opposite side of the rollers, the nippers on the entering side being screwed down hard upon the belt as soon as it is caught by the calender-rollers, while those on the delivering side of the rollers are left open for the free passage of the belt. By these means the belt is stretched and calendered at the same time, the nippers holding it while the rollers press and stretch it, the machine being made reversible in its motion, and fitted with a nipper on each side of the rollers, by which the belt can be stretched to and fro through the machine.

Now, the machine of this patent is applicable only to the stretching and calendering of ordinary belts—that is, belts having two ends—but is not applicable to the stretching of endless belts, because no provision is made in it for entering the "single" of such belts between the nippers and the rollers. The object of this present invention, therefore, is to provide a machine in which endless belts can be subjected to the same treatment precisely in the process of manufacture that the ordinary two-end belt is subject to by the machine of the patent above referred to, an object that can only be accomplished by constructing the calendering and stretching machine with cheeks or side frames, made in two separate and distinct parts, the one part being removable from the other, the one part carrying the top roller and nipper, together with their appurtenances, the other part carrying the lower rollers and nipper with their appurtenances. The machine being constructed in this way, the top part is raised up to admit the single thickness of the endless belt between the rollers and nippers, which being done the top part of the frame, with its roller and nipper, is lowered down in its place upon the lower part of the frame. The two parts are then joined by means of bolts or screws and the machine is ready for operation.

Reference being had to Figs. 1 and 2 of the drawings, P represents the lower part of the frame; A A, the two lower rollers; Y, the spur-driving wheel; C, the driving-pinion; B, the driving-pulley; D, an intermediate pinion; J', the lower nipper; O O, guide-pieces between which the belt I runs; J, the upper nipper; X, the upper nipper-frame; A', the upper roller; X', the upper part of the frame that carries the top rollers and all its appurtenances, consisting of the upper frame, X, the nipper-screws E, the two intermediate pinions, D', and the shaft S, the latter being fitted with an eccentric, H, connected to the bearings of the top roller-shaft, (not shown in the drawings,) by which the roller may be raised or lowered by means of a worm-screw, F, acting in a corresponding wheel fixed to the shaft S, substantially as shown.

The upper part of the frame, together with all its parts, are raised by means of turn-screw G, or by any other mechanical contrivance suitable for that purpose, applied to the beam M, fixed to the shaft S.

The two parts of the frame join at the point indicated by the belt-section I, and are held together by suitable guide pins and bolts. (Not shown in the drawings.)

When it is desired to introduce a belt to be calendered and stretched, as above described, the top part of the machine is raised up, as indicated by Fig. 3, the single of the belt being then introduced, as shown by I, Fig. 6.

Figure 4:
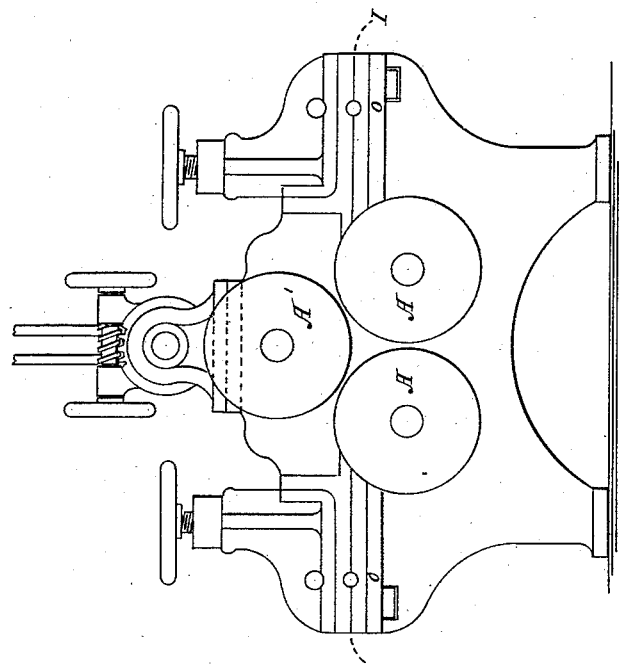

Figs. 4 and 5 of the drawings show the machine with one of the side frames removed, a plan that might be used as a mere substitute for the machine as shown by Figs. 1 and 2, but not without much trouble and inconvenience. It is a possible method of accomplishing the end in view, but not a desirable one. It is illustrated here merely to show that I have considered the possibility of using it. By Figs. 6 and 7 of the drawings is shown the machine with an addendum consisting of projecting ends A and A' on the rollers beyond the side frame of the machine, the stretching-nippers being applied in this case as before, as shown by the drawings. This arrangement serves a very good purpose for narrow belts where light calendering only is necessary; but if the calendering be heavy the belt will be made crooked, as it is found impossible by this method to get an equal pressure over the entire width of the belt. The journals and frame of the machine in this arrangement will yield enough to unequalize the pressure on the belt and make it crooked. The arrangement is improved by making journals on the out ends of the rollers and connecting them all together in an iron yoke having suitable journal-boxes to match the journals; but the arrangement, even as so modified, is not so satisfactory in its effect upon the belt, as when the belt is introduced in the middle of the rollers having both ends supported in a solid frame.

Having thus described the nature and extent of my invention, I claim and desire to secure by Letters Patent—

1. In the endless-belt-stretching machine substantially herein described, the combination of the upper calender-roller and the upper nipper-plates in a separate upper frame fitted upon the frame carrying the lower calender-rollers and stretching nipper-plates, said upper frame, calender-roller, and nipper-plates being susceptible of being lifted up to admit the belt between the upper and lower calender-rollers and nipper-plates, substantially as described.

2. In the endless-belt-stretching machine substantially herein described, a set of calender-rollers having calendering ends projecting beyond the frame of the machine, and combined with a set of stretching-nippers, also extending beyond or set outside of the frame of the machine to correspond with the projecting calender-rollers, substantially as described.

MAURICE GANDY.

Witnesses:
WM. H. BROADNAX,
AMOS BROADNAX.